(12) United States Patent
Smith (10) Patent No.: US 11,807,041 B2
(45) Date of Patent: Nov. 7, 2023

(54) FLOATING WHEEL COVER

(71) Applicant: PACCAR Inc, Bellevue, WA (US)

(72) Inventor: Jeffrey Paul Smith, Prosper, TX (US)

(73) Assignee: PACCAR Inc, Bellevue, WA (US)

(*) Notice: Subject to any disclaimer, the term of this patent is extended or adjusted under 35 U.S.C. 154(b) by 631 days.

(21) Appl. No.: 16/936,058

(22) Filed: Jul. 22, 2020

(65) Prior Publication Data

US 2022/0024246 A1    Jan. 27, 2022

(51) Int. Cl.
| | |
|---|---|
| *B60B 7/06* | (2006.01) |
| *B60B 7/04* | (2006.01) |
| *B60B 7/00* | (2006.01) |
| *B60B 7/20* | (2006.01) |

(52) U.S. Cl.
CPC ............ *B60B 7/063* (2013.01); *B60B 7/0026* (2013.01); *B60B 7/04* (2013.01); *B60B 7/068* (2013.01); *B60B 7/20* (2013.01); *B60B 2900/212* (2013.01)

(58) Field of Classification Search
CPC .... B60B 7/02; B60B 7/04; B60B 7/06; B60B 7/068; B60B 7/0026; B60B 7/0066; B60B 7/0073; B60B 7/20; B60B 2900/1216
See application file for complete search history.

(56) References Cited

U.S. PATENT DOCUMENTS

| | | | | |
|---|---|---|---|---|
| 6,536,848 | B1 * | 3/2003 | Goodman | ................ B60B 7/20 40/587 |
| 7,988,239 | B1 * | 8/2011 | Baker | ...................... B60B 7/04 301/37.371 |
| 7,997,640 | B1 * | 8/2011 | Wurm | .................. B62D 25/186 296/180.1 |
| 8,424,956 | B2 | 4/2013 | Stimel | |
| 9,346,316 | B2 * | 5/2016 | Hsiao | ........................ B60B 7/20 |
| 10,494,033 | B2 | 12/2019 | Haeseker et al. | |

(Continued)

FOREIGN PATENT DOCUMENTS

| | | | | |
|---|---|---|---|---|
| DE | 4324024 A1 | | 1/1995 | |
| DE | 102012020669 A1 | * | 5/2013 | ............... B60B 7/00 |

(Continued)

OTHER PUBLICATIONS

Machine Translation of JP H04176784 A, 6 pages (Year: 1992).*
Machine Translation of DE 102012020669 A1, 5 pages (Year: 2013).*

*Primary Examiner* — S. Joseph Morano
*Assistant Examiner* — Emily G. Castonguay
(74) *Attorney, Agent, or Firm* — SEED INTELLECTUAL PROPERTY LAW GROUP LLP (57) ABSTRACT

The present disclosure is directed to a wheel cover that is coupled to a wheel of a vehicle utilizing a mounting assembly that has a bearing block. A retainer assembly in combination with the bearing block of the mounting assembly allows the wheel cover to be coupled to the wheel in a manner such that the wheel cover does not rotate with the forward and backward rotation of the wheel when the vehicle is being driven. The wheel cover covers the wheel and partially covers a gap or space between a tire of the wheel and a fender of the vehicle, which increases the aerodynamic performance of the vehicle. The retainer assembly provides at least one degree of freedom such that the wheel cover may move with the wheel when steering the vehicle in a leftward direction and a rightward direction.

9 Claims, 10 Drawing Sheets

(56) References Cited

U.S. PATENT DOCUMENTS

| | | | | |
|---|---|---|---|---|
| 2006/0175892 A1* | 8/2006 | Korpi | ........................ | B60B 7/20 |
| | | | | 301/37.25 |
| 2012/0013113 A1* | 1/2012 | Trenne | ................. | B62D 25/182 |
| | | | | 280/849 |
| 2013/0096781 A1* | 4/2013 | Reichenbach | ......... | B60Q 1/326 |
| | | | | 280/849 |
| 2020/0283072 A1* | 9/2020 | Ballarin | .................... | B60B 7/00 |

FOREIGN PATENT DOCUMENTS

| | | | | |
|---|---|---|---|---|
| JP | H04176784 A | * | 6/1992 | ............... B60B 7/00 |
| WO | 2013/105943 A1 | | 7/2013 | |

* cited by examiner

FLOATING WHEEL COVER

BACKGROUND

Technical Field

The present disclosure is directed to a wheel cover that covers a wheel of a vehicle.

Description of the Related Art

Generally, vehicles such as cars, trucks, semi-trucks, vans, and the like include wheels within wheel wells surrounded by fenders. The wheels are spaced apart from inner surfaces of the fender so the wheels may turn in a leftward direction or a rightward direction to steer the vehicle when the vehicle is being driven. However, this space between the inner surface of the fender and the wheel is a discontinuity along the length of the vehicle that increases drag along the length of the vehicle, which reduces the overall fuel efficiency of the vehicle when being driven. The space reduces fuel efficiency due to outer body air flow moving faster along external surfaces of the vehicle relative to under body air flow underneath the vehicle. The space results in crosstalk between the fast flowing outer body air flow and the slower flowing under body air flow.

There are significant challenges to provide a wheel cover that forms a smooth sealed surface with the external surfaces of the vehicle to provide improved aerodynamics while allowing the wheels to turn in the leftward and rightward directions to steer the vehicle when being driven.

BRIEF SUMMARY

Embodiments of the present disclosure overcome significant challenges associated with the wheel covers discussed above.

The present disclosure is directed to various embodiments of wheel covers that cover all or a portion of a wheel of the vehicle and cover a majority of the space between the wheel and a fender of the vehicle. This covering of the space between the wheel and the fender significantly reduces the drag along the discontinuity at this space between the wheel and the fender, which increases the fuel efficiency of the vehicle when being driven.

One embodiment of the wheel cover includes a first portion and second portion that are coupled together by a third portion. The first portion, the second portion, and the third portion are integral with each other and made a flexible unitary, continuous material. The second portion is closer to a rear of the vehicle than the first portion and the third portion. The second portion has a first region, a second region, and a third region. The first region and the third region contact the fender when the vehicle is turning and the second region bends to provide at least one degree of freedom such that the wheel cover flexes and bends when the wheel is turning in a rightward direction and a leftward direction. The first region contacts the fender when the vehicle is turning in the rightward direction, and the third region contacts the fender when the vehicle is turning in a leftward direction. The first portion follows or mimics a turning movement of the wheel when the wheel moves in the rightward direction and the leftward direction. The third portion of the wheel well bends to provide at least one degree of freedom such that the first portion may follow or mimic the turning movement of the wheel.

The one embodiment of the wheel cover further includes a first slit and a second slit along with the third portion provide the at least one degree of freedom such that the first portion and the second portion may bend and flex when the wheel is turning. The first slit, the second slit, and the third portion separate the first portion from the second portion.

The one embodiment of the wheel cover is coupled to the wheel by a mounting assembly that includes a bearing block, and a retainer assembly that includes a first member coupled to an internal surface of the wheel cover and a second member coupled to an anchor component within the vehicle. The first member is slidably coupled to the second member. The mounting assembly in combination with the retainer assembly stop the wheel cover from rotating in a forward direction (e.g., counterclockwise) and a backward direction (e.g., clockwise) when the vehicle is being driven. However, the mounting assembly in combination with the retainer assembly provides at least one degree of freedom such that the wheel cover may turn in the leftward and the rightward directions with the wheel when the vehicle is turning in either the leftward or rightward direction.

BRIEF DESCRIPTION OF THE SEVERAL VIEWS OF THE DRAWINGS

In the drawings, identical references numbers identify similar elements or acts unless the context indicates otherwise. The sizes and relative proportion of the elements in the drawings are not necessarily drawn to scale.

DETAILED DESCRIPTION

In the following description, certain specific details are set forth in order to provide a thorough understanding of various embodiments of the disclosure. However, one skilled in the art will understand that the disclosure may be practiced without these specific details. In other instances, well-known structures and components associated with vehicles such as trucks, cars, aircraft, watercraft, etc. have not been described in detail to avoid unnecessarily obscuring the descriptions of the embodiments of the present disclosure.

Unless the context requires otherwise, throughout the specification and claims that follow, the word "comprise" and variations thereof, such as "comprises" and "comprising," are to be construed in an open, inclusive sense, that is, as "including, but not limited to."

The use of ordinals such as first, second, third, fourth, etc., does not necessarily imply a ranked sense of order, but rather may only distinguish between multiple instances of an act or structure.

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The terms "left," and "right," are used for only discussion purposes based on the orientation of the components in the discussion of the Figures in the present disclosure as follows. These terms are not limiting as the possible positions explicitly disclosed, implicitly disclosed, or inherently disclosed in the present disclosure.

The term "substantially" is used to clarify that there may be slight differences when a battery tray is manufactured in the real world, as nothing can be made perfectly equal or perfectly the same. In other words, substantially means that there may be some slight variation in actual practice and instead is made within accepted tolerances.

As used in this specification and the appended claims, the singular forms "a," "an," and "the" include plural referents unless the content clearly dictates otherwise.

While various embodiments are shown and described with respect to wheel covers and vehicles such as semi-trucks, it will be readily appreciated that embodiments of the present disclosure are not limited thereto. In various embodiments, the structures, devices, methods and the like described herein may be embodied in or otherwise utilized in any suitable type or form of a wheel cover in any vehicle, and may be manufactured utilizing any suitable manufacturing technologies as desired.

Figure 1:
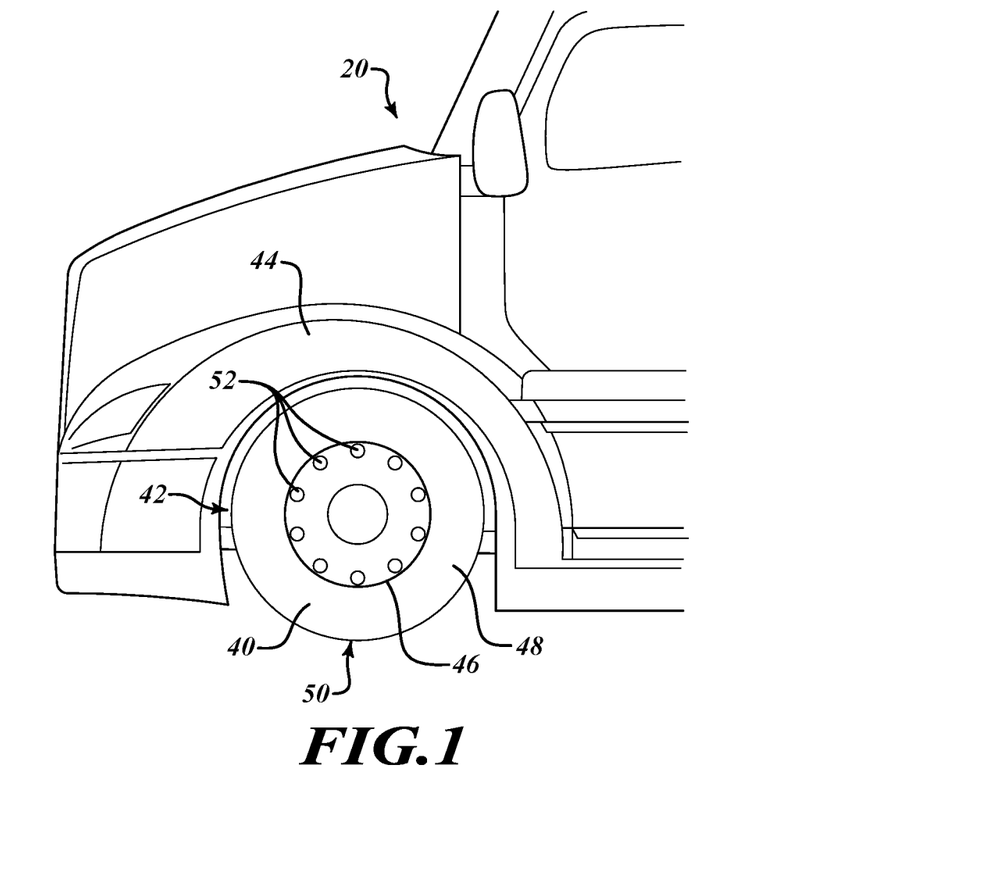
FIG. 1 is a side view of a vehicle with a wheel.

FIG. 1 is directed to a vehicle 20 with a wheel 40, a wheel well 42, and a fender 44. The fender 44 surrounds the wheel well 42 and the wheel 40 is positioned within the wheel well 42 of the vehicle 20. The wheel 40 includes a rim 46 and a tire 48 that surrounds the rim 46. The tire 48 includes a ground contact surface 50 that has a tread. The ground contact surface 50 is configured to, in operation, contact a ground surface that the vehicle is being driven on. For example, the ground surface may be dirt, gravel, asphalt, concrete, or some other material that acts as a road or is driven on. The wheel 40 is mounted to the vehicle 20 by a plurality of members 52 on which the wheel 40 is positioned and coupled. The wheel 40 is mounted on the vehicle 20 by a plurality of fasteners 53 that threadly coupled to the plurality of members 52 mechanically coupling the wheel 40 to an axle of the vehicle 20. In some other embodiments, the fasteners 53 may be snap fit fasteners, interference fit fasteners, lug nuts, or some other type of fastener to couple the wheel 40 to the vehicle 20. The plurality of members 52 protrude outward from the wheel 40. The plurality of members 52 may be wheel studs, wheel bolts, or some other protruding member that extends outward from the wheel 40 on which a component may be mounted or coupled.

Figure 2A:
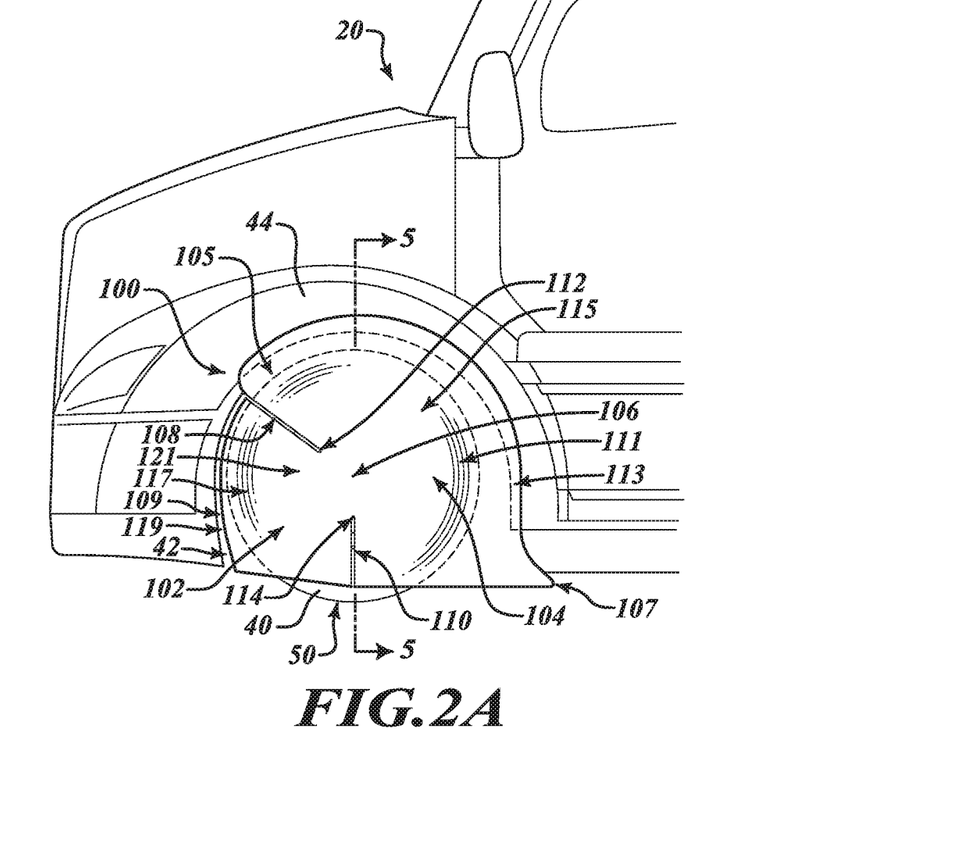
FIG. 2A is a side view of an embodiment of a wheel cover on a vehicle covering a wheel.

FIGS. 2A-2D are directed to the vehicle 20 including an embodiment of a wheel cover 100 disclosed herein covering the wheel 40 and partially covering the wheel well 42 of the fender 44 in which the wheel 40 is positioned. The wheel cover 100 is configured to, in operation of the vehicle 20, decrease a drag force when the vehicle 20 is being driven. The drag force that is reduced by the wheel cover 100 is a result of pressure cross-talk between fast moving outer-body air-flow over external surfaces of the vehicle 20 and slow under-body air flow underneath the vehicle 20 when the vehicle 20 is being driven. This difference in air-flow outside the vehicle and underneath the vehicle when the vehicle is being driven results in pressure cross-talk through the wheel well 42. In other words, when the vehicle 20 is being driven and when the wheel 40 and wheel well 42 are uncovered, there is a relatively large amount of drag force that exists relative to when the wheel 40 and the wheel well 42 are covered by the embodiment of the wheel cover 100 as shown in FIG. 2A.

Figure 2B:
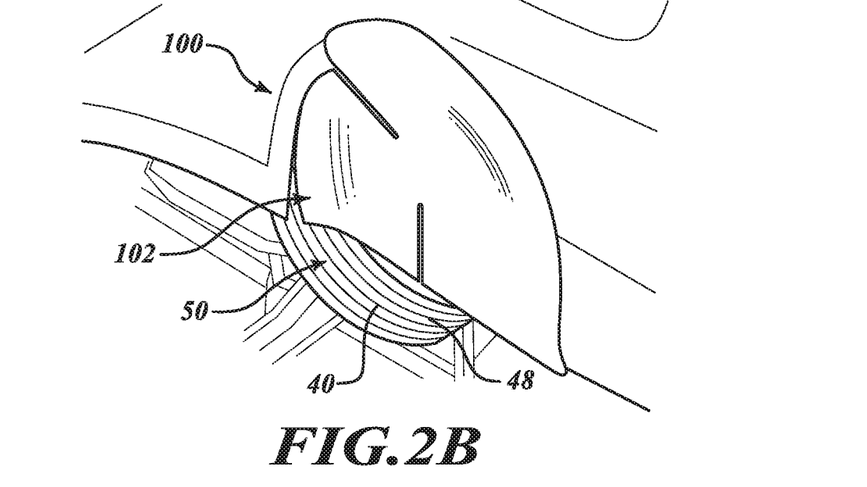
FIG. 2B is a bottom-plan perspective view of the embodiment of the wheel cover on the vehicle covering the wheel in FIG. 2A.

FIG. 2A is a side view and FIG. 2B is a perspective view of the vehicle 20 that utilizes the wheel cover 100. The vehicle 20 may be a semi-truck, a car, a pickup truck, a van, or some other vehicle. The wheel 40 is a front wheel of the vehicle 20 in FIG. 2A.

The wheel cover 100 includes a first portion 102, a second portion 104, and a third portion 106 that is centrally located and extends between the first portion 102 and the second portion 104. The wheel well 42 defines an opening having a periphery having a first curvature and the first portion 102 and the second portion 104 each include an outermost periphery that have a second curvature that is substantially the same as the first curvature of the wheel well 42.

The third portion 106 couples the first portion 102 to the second portion 104. The first portion 102, the second portion 104, and the third portion 106 are integral with each other and made of a unitary, continuous material that is flexible. The unitary, continuous material is flexible such that when the unitary, continuous material is flexed and bent when the vehicle is turning in a first direction or a second direction, the unitary, continuous material does not break or snap. The outer periphery of the first portion 102 is spaced apart from the fender by a gap 109 that extends from the outer periphery of the first portion 102 to the fender 44. The gap 109 provides space for the first portion 102 of the wheel cover 100 to articulate with the wheel 40 when the wheel is turning in either a first direction or a second direction, which will be discussed in greater detail later herein with respect to FIGS.

3A-3C and 4A-4C. The first direction may be a rightward direction and the second direction may be a leftward direction.

The outer periphery of the second portion 104 of the wheel cover 100 extends to the fender 44, overlaps the fender 44 and physically contacts the fender 44. The second portion 104 bends and flexes when the wheel 40 is turning in the first direction or the second direction due to the contact between the fender 44 and the second portion 104, which will be discussed in greater detail later herein with respect to FIGS. 3A-3C and 4A-4C.

The outer periphery of the second portion 104 of the wheel cover 100 has a first end 105 and a second end 107. The first end 105 is closer to the first portion 102 of the wheel cover 100 relative to the second end 107. The outer periphery of the first end 105 is curved or rounded and the outer periphery of the second end 107 comes to a point between two outer edges of the wheel cover 100. The second end 107 may be referred to as a tail end. The second end 107 is closer to a rear of the vehicle 20 relative to the first end 105, and conversely, the first end 105 is closer to a front of the vehicle 20 relative to the second end 107. The second end 107 of the second portion 104 is shown at the right most end of the wheel well 42 based on the orientation in FIG. 2A.

A first slit 108 and a second slit 110 extend from outer edges of the wheel cover 100 towards the third portion 106 of the wheel cover 100. The first slit 108 has a first end 112 and the second slit 110 has a second end 114 that are spaced apart from each other and separated by the third portion 106. In other words, the third portion 106 is positioned between the first end 112 and the second end 114 of the first and second slits 108, 110, respectively. The first slit 108, the second slit 110, and the third portion 106 separate the first portion 102 from the second portion 104. The third portion 106 extends between the first portion 102 and the second portion 104, and the third portion 106 couples the first portion 102 to the second portion 104. As discussed earlier, the first portion 102, the second portion 104, and the third portion 106 are integral with each other and made of a unitary, continuous material that is flexible.

The first and second slits 108, 110 allow the third portion 106 to bend and flex when the wheel 40 turns in the first direction or the second direction. The first slit 108 is at an acute angle relative to the ground surface on which the vehicle 20 is driven, and the second slit 110 is substantially at a 90-degree angle relative to the ground surface on which the vehicle 20 is driven. This functionality of the slits 108, 110 in relation to the bending of the third portion 106 will be discussed in greater detail later herein with respect to FIGS. 3A-3C and 4A-4C. In the illustrated embodiment, the acute angle is about 45°; however, embodiments in accordance with the present disclosure are not limited to the acute angle being 45°. The acute angle can be less than or greater than 45°, for example, the acute angle can be 40°, 35° or 30°. The acute angle can be more than 45°, for example, 50°, 55° or 60°. Similarly, the angle of slit 110 relative to the ground surface is not limited to being 90°. For example, the angle of slit 110 relative to the ground surface can be greater than 90°, for example, 95°, 100°, or 105° or the angle of slit 110 relative to the ground surface can be less than 90°, for example, 85°, 80° or 75°.

The second portion 104 further includes a first surface 111 that is spaced inward from an outer edge of the second portion 104. The first surface 111 of the second portion 104 protrudes outward from the wheel well 42 and the fender 44 and follows the profile of the wheel 40 such that the first surface 111 is curved. In other words, the first surface 111 mimics the profile and shape of the rim 46 and the tire 48 of the wheel 40 such that the first surface 111 is curved to have a profile or outline substantially similar to or representative of the profile, shape, or outline of the wheel 40. The first surface 111 of the second portion 104 is arcuate and extends from the first slit 108 to the second slit 110. The distance between the first surface 111 and the outer periphery of the second portion 104 between the first slit 108 and the second slit 110 remains substantially constant so that the first surface mimics the arcuate outer periphery of the second portion 104. The first surface 111 extends between a second surface 113 of the second portion 104 and a third surface 115 of the second portion 104. The second surface 113 and the third surface 115 are substantially flat surfaces relative to the first surface 111. The second surface 113 and the third surface 115 are coupled together by the first surface 111. The second surface 113 is closer to the vehicle 20 than the third surface 115. The second surface 113 partially covers a gap or space between the fender 44 and the tire 48 in the wheel well 42.

The first portion 102 of the wheel cover 100 partially wraps around the forward face of tire 48 and may partially cover the ground contact surface 50 of the tire 48. The first portion 102 has a first surface 117 similar to the first surface 111 of the second portion 104 of the wheel cover 100. The first surface 117 protrudes outward from the wheel well 42 and the fender 44 and follows the profile of the wheel 40 such that the first surface 117 is curved. In other words, the first surface 117 mimics the profile and shape of the rim 46 and the tire 48 of the wheel 40 such that the first surface 117 is curved to have a profile or outline substantially similar to or representative of the profile, shape, or outline of the tire 48. The first surface 117 of the first portion 102 is arcuate and extends from the first slit 108 to an outer edge of the wheel cover 100. This outer edge of the wheel cover 100 is adjacent the ground. The distance between the first surface 117 and an outer periphery of the first portion 102 between the first slit 108 and the outer edge remains substantially constant so that the first surface 117 mimics the arcuate outer periphery of the first portion 102. The first surface 117 extends between a second surface 119 of the first portion 102 and a third surface 121 of the first portion 102. The third surface 121 is a substantially flat surface relative to the first surface 117. The second surface 119 a curved surface that partially wraps around the ground contact surface 50 of the tire 48. The second surface 119 and the third surface 121 are coupled together by the first surface 117. The second surface 119 is closer to the vehicle 20 than the third surface 121.

FIG. 2B is a bottom-plan perspective view of the vehicle 20 with the wheel cover 100.

Figure 2C:
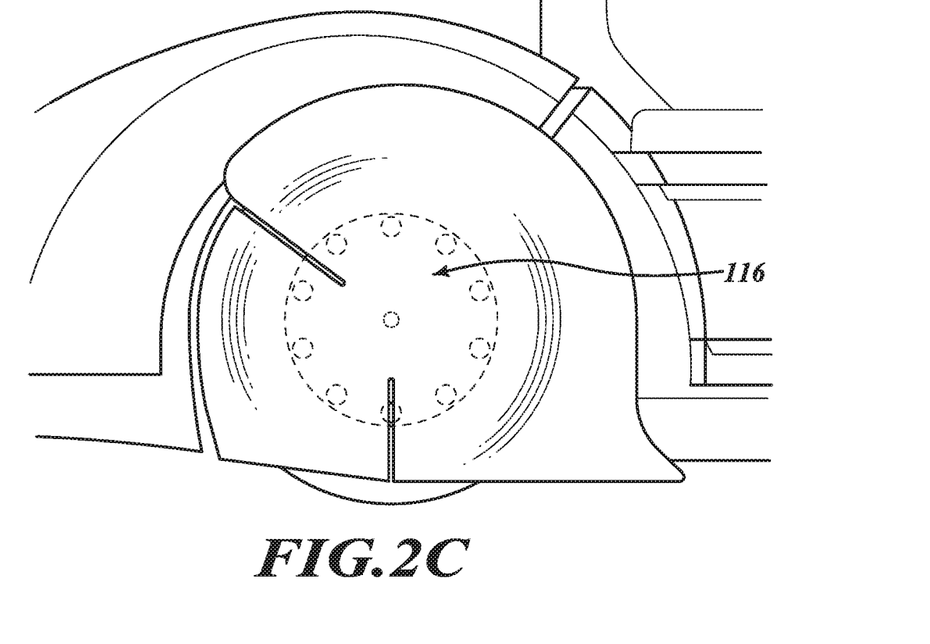
FIG. 2C is an external surface view of the embodiment of the wheel cover of the vehicle covering the wheel in FIGS. 2A-2B.

FIG. 2C is a zoomed-in external side view of the wheel cover 100. The wheel cover 100 includes an external surface 116 that faces outward and will be exposed to an external air-flow that passes along external surfaces of the vehicle 20. The external surface 116 of the wheel cover 100 is defined by external surfaces of the first portion 102, the second portion 104, and the third portion 106 of the wheel cover 100. For example, the external surface 116 includes the first surface 111, the second surface 113, and the third surface 115 of the second portion 104 of the wheel cover 100.

Figure 2D:
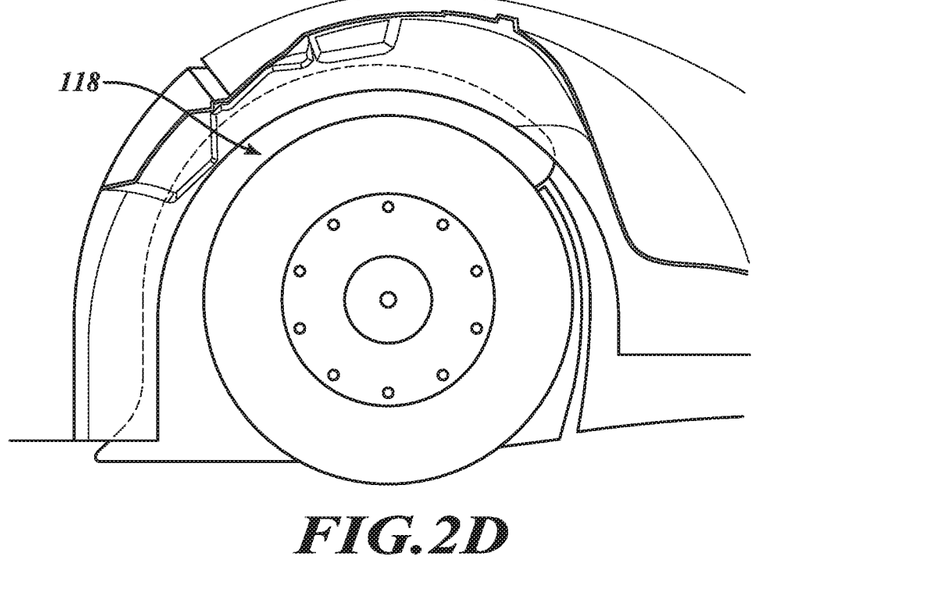
FIG. 2D is an internal surface view of the embodiment of the wheel cover on the vehicle covering the wheel in FIGS. 2A-2C.

FIG. 2D is a zoomed-in internal side view of the wheel cover 100. The wheel cover 100 includes an internal surface 118 that faces inward toward internal components of the vehicle 20 such as an engine compartment, an axle, a tire rod, or some other component positioned internally within the vehicle 20 that does not rotate and is substantially stationary within the vehicle 20.

Figure 3A:
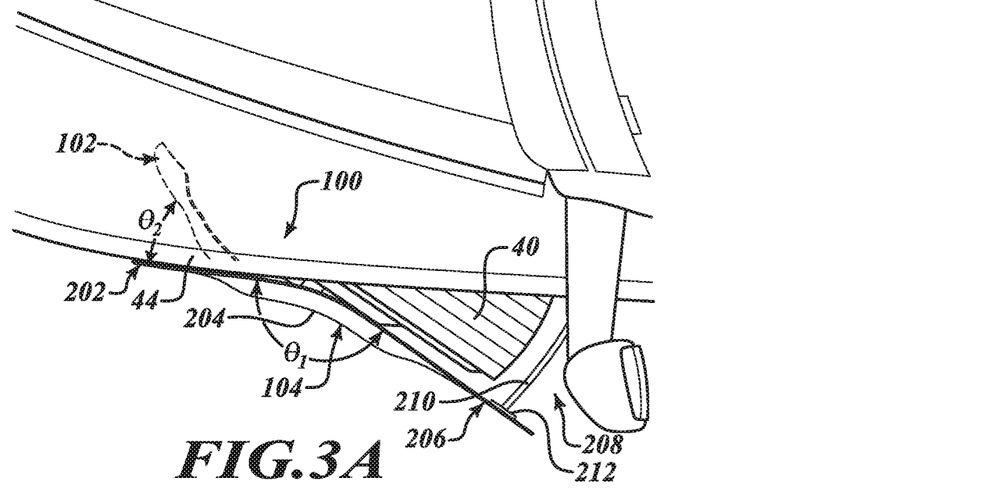
FIG. 3A is a top-plan view of an embodiment of a wheel cover system utilizing the wheel cover in FIGS. 2A-2D when the vehicle is turning rightward.
Figure 3B:
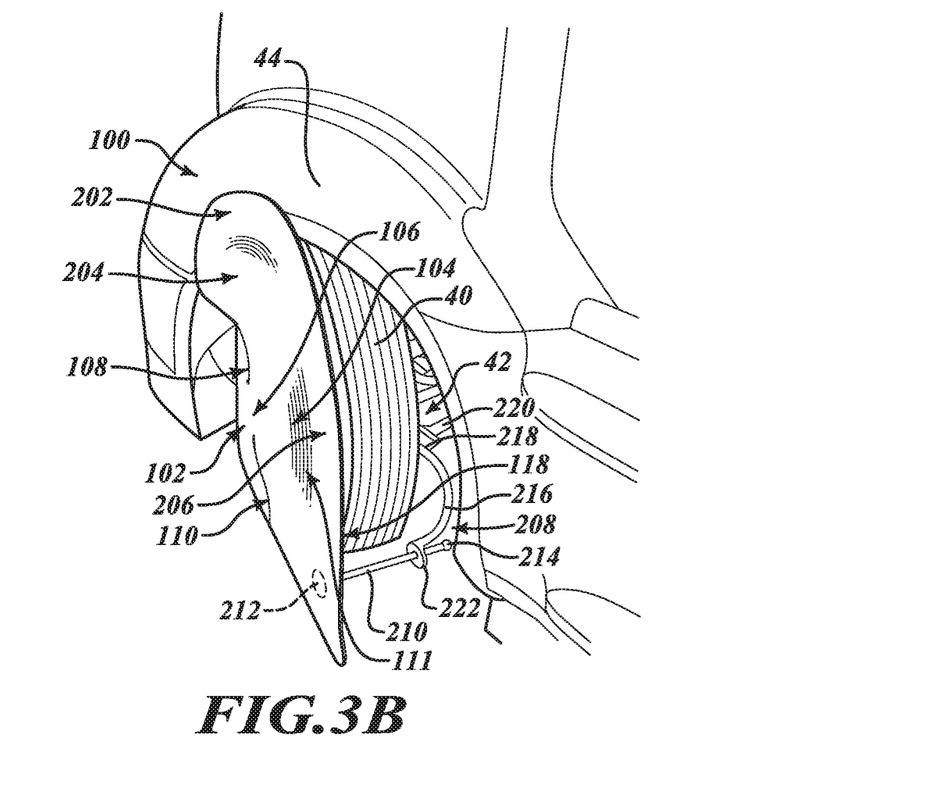
FIG. 3B is a rearward perspective view of the embodiment of the wheel cover system in FIG. 3A utilizing the wheel cover in FIGS. 2A-2D when the vehicle is turning rightward.
Figure 3C:
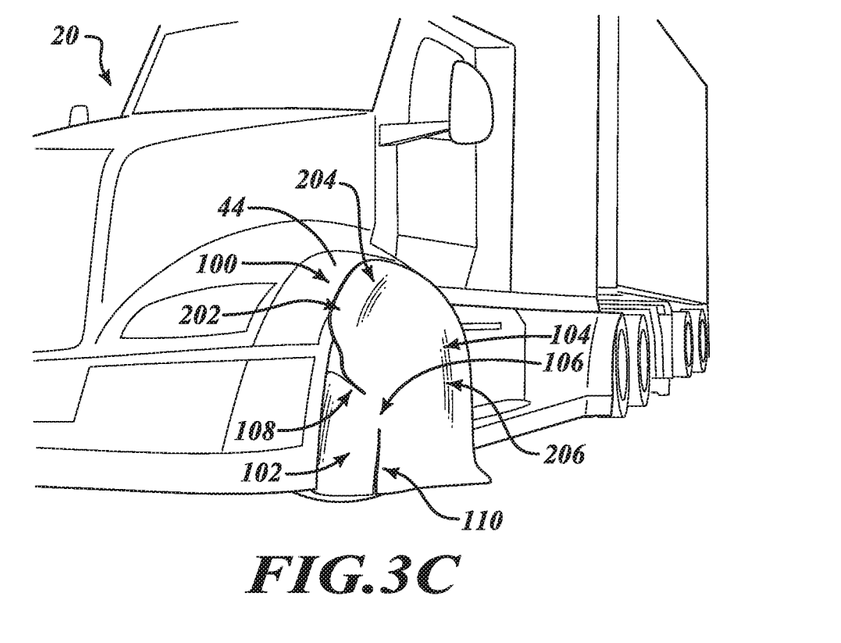
FIG. 3C is a frontward perspective view of the embodiment of the wheel cover system in FIGS. 3A-3B utilizing the wheel cover in FIGS. 2A-2D when the vehicle is turning rightward.

FIGS. 3A-3C show the vehicle 20 with the wheel cover 100 as discussed in FIGS. 2A-2D. In FIGS. 3A-3C, the vehicle 20 is turning in a rightward direction such that the wheel cover 100 contacts the fender 44, and the wheel cover 100 bends and flexes in reaction to wheel cover 100 contacting the fender 44 while the trailing end of the wheel cover 100 swings outward and away from the vehicle.

FIG. 3A is a top-plan view of the wheel 40 turning in the rightward direction causing the wheel cover 100 to contact the fender 44 such that the wheel cover 100 bends and flexes.

When the vehicle 20 is turning in the rightward direction, the second portion 104 of the wheel cover 100 includes a first region 202 that contacts a first portion of the fender 44. The first region 202 may be referred to as a first contact region or some other reference to a region of the wheel cover 100 that contacts the fender 44 when the vehicle 20 is turning in the rightward direction. A region of the internal surface 118 aligned with the first region 202 of the wheel cover 100 contacts the first portion of the fender 44. The first portion of the fender 44 may be referred to as a forward portion, a front portion, or some other reference to a portion of the fender 44. The first region 202 is aligned with the second surface 113 of the wheel cover 100. The first region 202 has the second curvature of the second portion 104 of the wheel cover 100.

When the vehicle 20 is turning in the rightward direction and the first region 202 of the wheel cover 100 contacts the first portion of the fender 44, a second region 204 of the wheel cover 100 bends and flexes in reaction to the first region 202 contacting the first portion of the fender 44 and the wheel 40 turning rightward The second region 204 bends and flexes such that a third region 206 of the second portion 104 of the wheel cover 100 is transverse to the first region 202 by an angle $\theta_1$, which can be seen in FIG. 3A. The angle $\theta_1$ is an obtuse angle. The third region 206 is aligned with the second surface 113 of the wheel cover 100. The third region 206 has the second curvature of the second portion 104 of the wheel cover 100.

When the vehicle is turning in the rightward direction, the first portion 102 of the wheel cover 100 enters the wheel well 42. The slits 108, 110 provide at least one degree of freedom such that the third portion 106 may bend and flex allowing the first portion 102 to enter the wheel well 42 as the wheel 40 is turned in the rightward direction. In other words, the at least one degree of freedom provided by the slits 108, 110 allows the first portion 102 of the wheel cover 100 to follow and mimic a movement of the wheel 40 such as turning rightward. As the wheel cover 100 follows and mimics movement of the wheel 40 during the rightward turning, the first portion 102 becomes transverse to the first region 202 of the second portion 104 by an angle $\theta_2$, which can be seen in FIG. 3A. The angle $\theta_2$ is an acute angle.

FIG. 3B is a rearward perspective view of the wheel 40 turning in the rightward direction causing the wheel cover 100 to contact the fender 44 such that the wheel cover 100 bends and flexes. The bending and flexing of the wheel cover 100 was discussed earlier with respect to FIG. 3A and will not be reproduced for brevity and simplicity sake of the present disclosure herein.

A wheel cover system in accordance with some embodiments includes a retainer assembly 208 having a first member 210 coupled to the internal surface 118 of the wheel cover 100. The first member 210 protrudes outward from the internal surface 118 of the wheel cover 100 towards the centerline of the vehicle. The first member 210 may be referred to as a sliding member, a degree-of-freedom member, a protruding member, or some other reference or language directed to the first member 210. The first member 210 has a first end 212 that is physically coupled to the internal surface of the wheel cover 100. The first member 210 may be physically coupled by welding the first member 210 to the internal surface 118, or a reception component may be on the internal surface 118 of the wheel cover 100 that is configured to receive and hold the first member 210. For example, the reception component may be a snap-fit component, a threaded component, or some other component capable of receiving and holding the first end 212 of the first member 210.

The first member 210 further includes a second end 214 opposite from the first end 212. The second end 214 of the first member 210 may have a spherical shape, a triangular shape, a rectangular shape, or some other shape. The second end 214 may be referred to as a stop end, a retainer end, or some other reference or language directed to the second end 214.

The retainer assembly 208 further includes a second member 216 that has a first end 218 coupled to a component 220 of the vehicle 20. The component 220 does not rotate or spin and is substantially stationary relative to a frame of the vehicle 20. The component 220 may be an axle, a tire rod, or some other component positioned internally within the vehicle 20 that does not rotate and is substantially stationary relative to the frame of the vehicle 20. The second member 216 includes a second end 222 that receives the first member 210. The second end 222 may be referred to as a reception end, a receiver end, or some other reference or language to the second end 222, which is configured to receive the first member 210. For example, the second end 222 may be an eyelet that receives the first member 210 in a slidable manner, which can be seen in FIG. 3B. The second member 216 may be referred to as a reception member, an anti-rotation member, a receiver member, or some other reference or language to the second member 216.

When the vehicle 20 is turning in the rightward direction as shown in FIG. 3B, the first member 210 slides along and through the second end 222 of the second member 216. In other words, the first member 210 is slidably coupled to the second member 216. This sliding of the first member 210 within the second end 222 of the second member provides at least one degree of freedom such that the wheel 40 may turn in the rightward and the leftward directions when covered by the wheel cover 100. The retainer assembly 208 works together with a bearing block (e.g., a wheel spinner) of a mounting assembly to couple the wheel cover 100 to the wheel 40 and stop the wheel cover from rotating with a forward rotation and a backward rotation of the wheel 40 when the vehicle 20 is moving in a forward direction or a backward direction. A mounting assembly including a bearing block will be discussed later in detail with respect to FIG. 5 of the present disclosure herein as well as the mounting assembly's relationship with the retainer assembly 208.

FIG. 3C is a frontward perspective view of the wheel 40 turning in the rightward direction causing the wheel cover 100 to contact the fender 44 such that the wheel cover 100 bends and flexes as discussed with respect to FIGS. 3A and 3B. The bending and flexing of the wheel cover 100 was discussed earlier with respect to FIG. 3A and will not be reproduced for brevity and simplicity sake of the present disclosure herein.

Figure 4A:
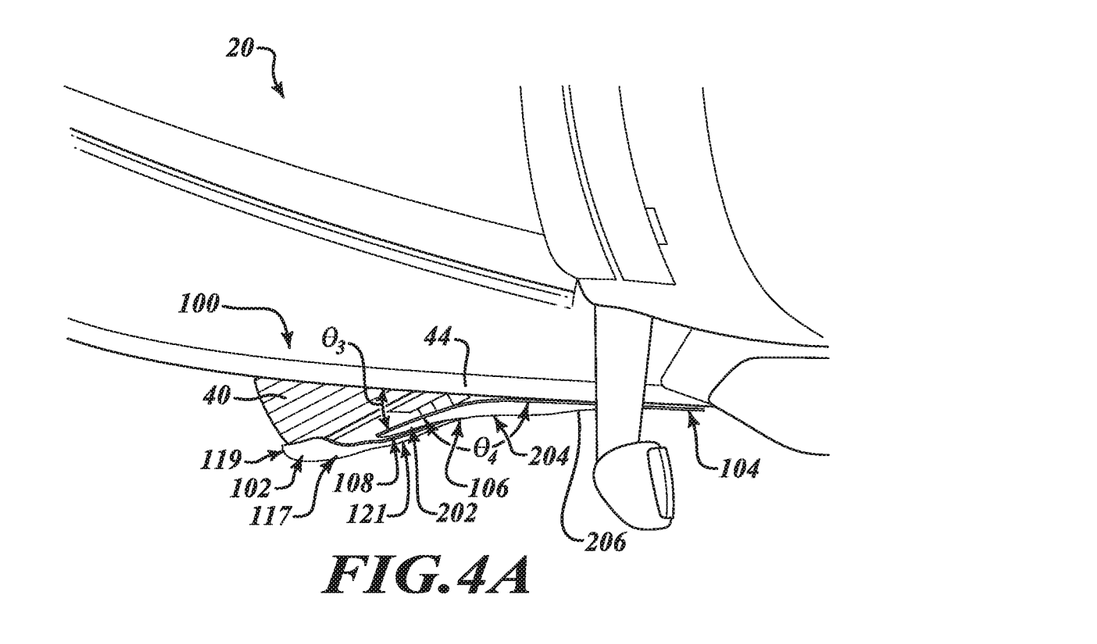
FIG. 4A is a top-plan view of the embodiment of the wheel cover system in FIGS. 3A-3C utilizing the wheel cover in FIGS. 2A-2D when the vehicle is turning leftward.
Figure 4B:
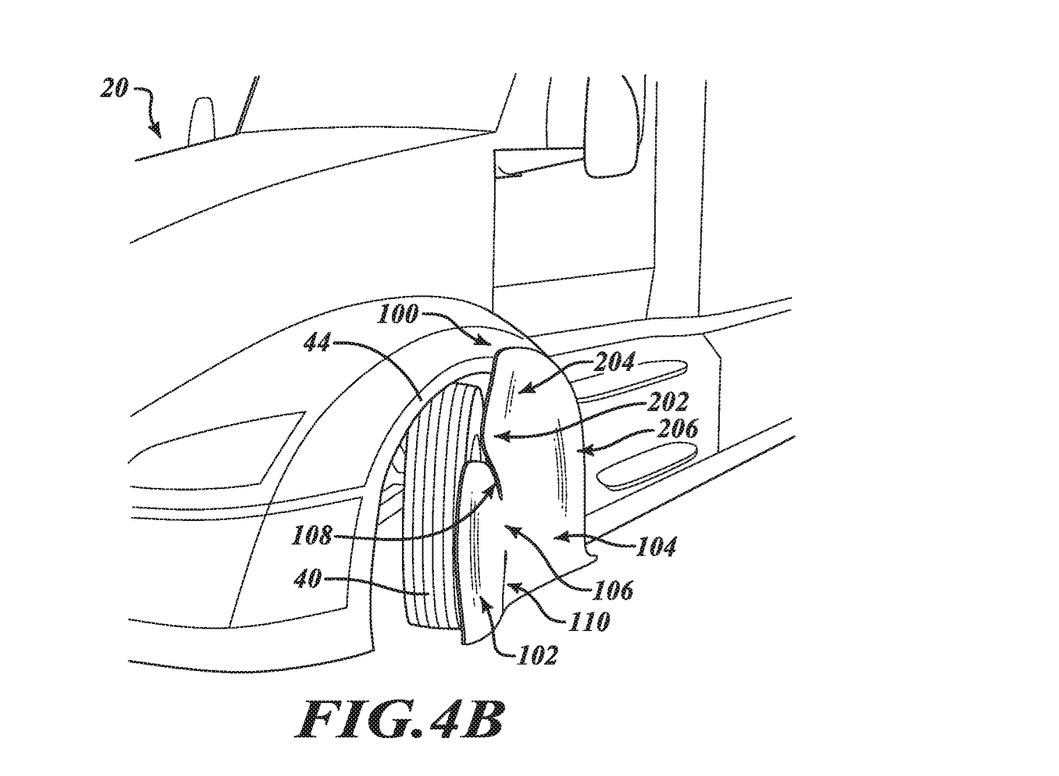
FIG. 4B is frontward perspective view of the wheel cover system in FIGS. 3A-3C utilizing the wheel cover in FIGS. 2A-2D when the vehicle is turning leftward.
Figure 4C:
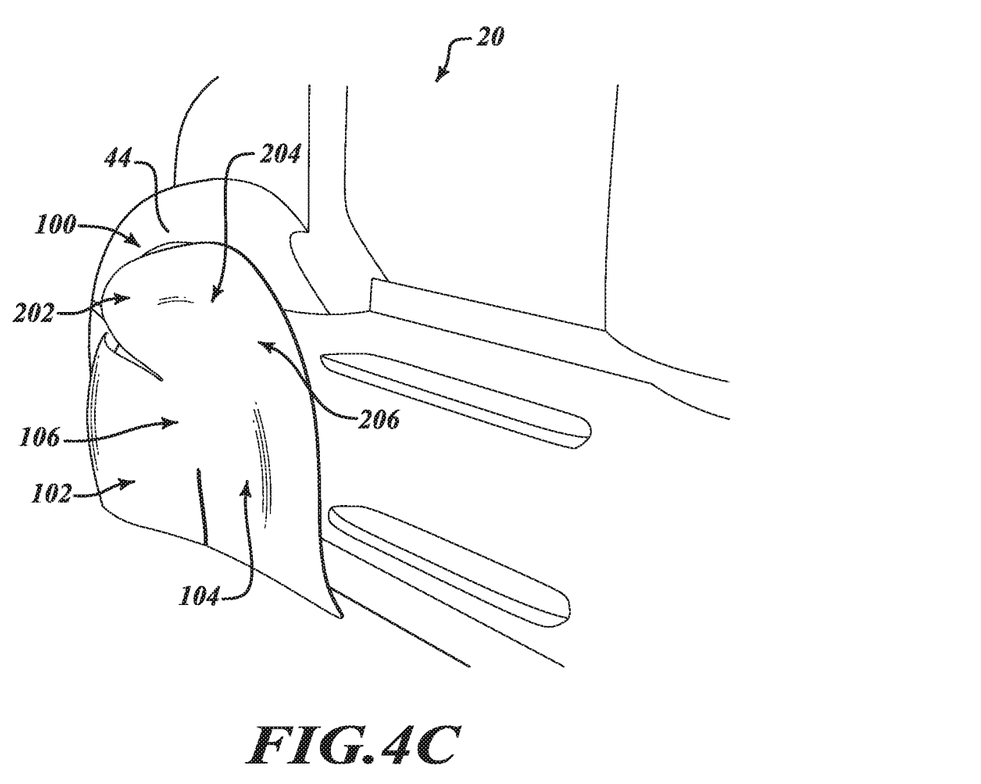
FIG. 4C is a rearward perspective view of the wheel cover system in FIGS. 3A-3C utilizing the wheel cover in FIGS. 2A-2D when the vehicle is turning leftward.

FIGS. 4A-4C show the vehicle 20 with the wheel cover 100 as shown in FIGS. 2A-2D. The vehicle 20 is turning a leftward direction such that the wheel cover 100 bends and flexes in reaction to the vehicle 20 turning in the leftward direction.

When the vehicle 20 is turning in the leftward direction, the third region 206 of the second portion 104 of the wheel cover 100 contacts a second portion of the fender 44. The second portion of the fender 44 may be referred to as a rear portion of the fender 44, which is closer to the rear of the vehicle 20 than the first portion of the fender 44 as discussed with respect to FIGS. 3A-3C. A region of the internal surface 118 aligned with the third region 206 of the wheel cover 100 contacts the second portion of the fender 44.

In some embodiments, the first region 202 of the wheel cover 100 may still be contacting the first portion of the fender 44 as discussed above with respect to FIGS. 3A-3C. In some embodiments, the first region 202 may be slightly spaced apart from the first portion of the fender 44. In some embodiments, the first region 202 may bend with the first portion 102 of the wheel cover 100 such that the first portion 102 and the first region 202 are substantially parallel with each other and aligned with each other in the top plan view.

When the vehicle 20 is turning in the leftward direction and the third region 206 of the wheel cover 100 contacts the second portion of the fender 44, the first portion 102 and the first region 202 of the second portion 104 of the wheel cover 100 follow and mimic the movement of the wheel 40 in a similar fashion as discussed above with respect to when the vehicle 20 is turning in the rightward direction. The slit 110 provides at least one degree of freedom such that third portion 106 and the second region 204 may bend and flex to allow the first portion 102 and the first region 202 to be transverse to the external surfaces of the vehicle 20.

The first portion 102 and first region 202 protrude outward from the wheel well 42 and external surfaces of the vehicle 20 when turning in the leftward direction. The first portion 102 and the first region 202 become transverse to the fender 44 by an angle $\theta_3$, which is an acute angle. The first portion 102 and the first region 202 become transverse to the third region 206 of the second portion 104 of the wheel cover 100 by an angle $\theta_4$, which is an obtuse angle. The first portion 102 and the first region 202 of the second portion 104 of the wheel cover 100 remain substantially parallel with each other. The second region 204 is bent in opposite manner as shown in FIGS. 3A-3C as the vehicle 20 is turning in the leftward direction in FIGS. 4A-4C whereas the vehicle 20 is turning in the rightward direction in FIGS. 3A-3C. However, the bending and flexing of the second region 204 in this opposite manner is similar to the bending and flexing of the first region 202 as discussed above with respect FIGS. 3A-3C and, therefore, is not reproduced for brevity and simplicity sake of the present disclosure herein.

In some embodiments, the second region 204 may be bent due to degrees of freedom provided by the slits 108, 110 such that the first region 202 is substantially parallel with the second region 204 and the third region 206. In some embodiments, the first region 202 may be transverse by a different angle than the angle $\theta_3$ of the first portion 102, the different angle may be less than the angle $\theta_3$.

While the above discussion with respect to the wheel cover 100 is on one side of the vehicle 20, another wheel cover 100 may be placed on the other side of the vehicle opposite to the wheel cover 100 shown in FIGS. 3A-3C and 4A-4C. The wheel cover 100 on the opposite side of the vehicle functions in a similar manner as discussed with the wheel cover 100 in FIGS. 3A-3C and 4A-4C. However, unlike the wheel cover 100 as discussed with respect to FIGS. 3A-3C and 4A-4C, the first region 202 of the wheel cover 100 on the opposite side of the vehicle 20 will contact the fender 44 when the vehicle 20 is turning in the leftward direction, and the third region 206 of the wheel cover 100 on the opposite side of the vehicle 20 will contact the fender 44 when the vehicle is turning in the rightward direction.

Figure 5:
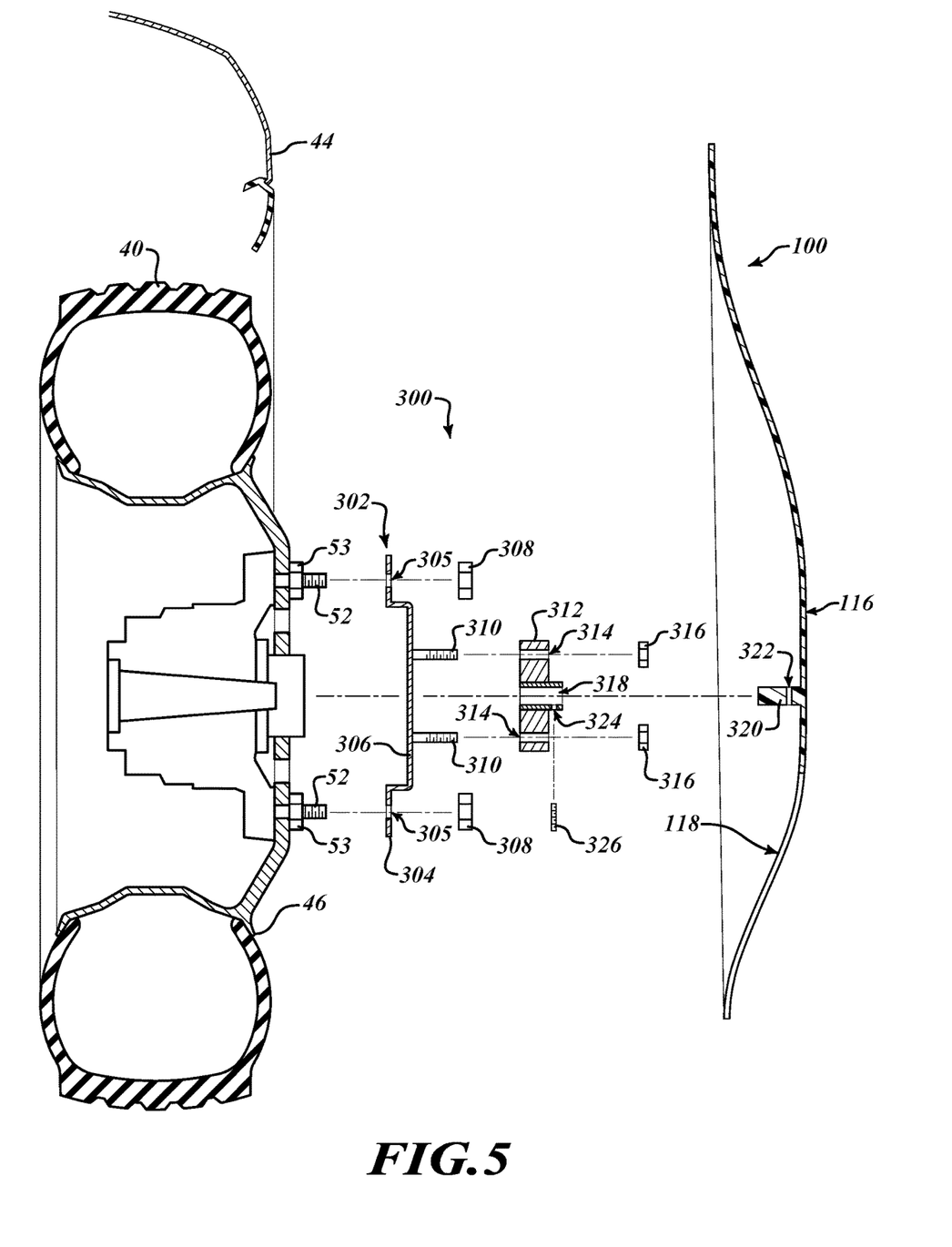
FIG. 5 is an exploded, cross-sectional view take along line 5-5 of the embodiment of the wheel cover system in FIG. 2A.

FIG. 5 is an exploded, cross-sectional view taken along line 5-5 in FIG. 2A. FIG. 5 illustrates a mounting assembly 300 that couples the wheel cover 100 as shown in FIGS. 2A-2D, 3A-3C, and 4A-4C to the wheel 40. The mounting assembly 300 includes a bracket 302 that is coupled to the plurality of members 52, which may be referred to as wheel studs 52. As previously discussed, the wheel studs 52 protrude outward from the wheel 40. As discussed earlier, the wheel 40 is coupled to the vehicle by the wheel studs 52 and the plurality of fasteners 53, which may be lug nuts 53.

The bracket 302 includes openings 305 in a first edge portion 304 of the bracket. Each opening 305 receives a corresponding one of the wheel studs 52 of the wheel 40. For example, the bracket may have a first opening that receives a first wheel stud 52 and a second opening that receives a second wheel stud 52. In some embodiments, the first opening may receive more than one of the wheel studs 52 and the second opening may receive more than one of the wheel studs 52. In other words, the openings 305 may be configured to receive any number of the wheel studs 52 protruding from the wheel 40. The opening 305 receive a portion of the wheel stud that extends outward past the lug nut 53.

In some embodiments, there may be more than two openings 305 that each receive one or more of the wheel studs 52 (e.g., three openings, five openings, ten openings, etc.). For example, the number of openings 305 may be a one-to-one relationship with the number of wheel studs 52.

Once the bracket 302 has been slide onto the wheel studs 52 through the openings 305 in the bracket 302 at the first edge portion 304, fasteners 308 are attached to the wheel studs 52 to hold the bracket 302 on the wheel studs 52 of the wheel 40. The wheel studs 52 may be threaded to receive the fasteners 308, which may be a plurality of nuts. The bracket 302 is positioned between the lug nuts 53 and the fasteners 308, and the bracket 302 may come into physical contact with the wheel studs 52, the lug nuts 53, and the fasteners 308.

In some embodiments, the openings 305 may be configured to receive the lug nuts 53 and fasteners 308 may have a diameter that is greater than a diameter of the lug nuts 53 to couple the bracket 302 to the wheel studs 52 and the lug nuts 53. The bracket 302 is positioned between the wheel 40 and the fastener 308, and the bracket 302 may come into physical contact with the wheel 40, the fastener 308, and the lug nut 54.

In some embodiments, the wheel studs 52 may not be threaded but may instead be configured to receive snap fit fasteners. When the wheel studs 52 are configured to receive snap fit fasteners, the fasteners 308 are snap fit fasteners to be coupled to ends of the wheel studs 52 to hold the bracket 302 in place on the wheel 40. These snap fit fasteners 308 are pressed onto the ends of the wheel studs 52 and form a snap fit to retain the bracket 302.

In some embodiments, the openings 305 in the first edge portion 304 of the bracket 302 may be snap fit openings 305 that receive wheel studs 52 with snap fit ends to couple the bracket 302 to the wheel studs 52 of the wheel 40.

In some embodiments, the openings 305 in the first edge portion 304 may be interference openings that form an interference fit with the wheel studs 52 to couple the bracket 302 to the wheel studs 52 of the wheel 40.

The bracket 302 further includes a second central portion 306 that is surrounded by the first edge portion 304. The second central portion 306 includes protruding portions 310 that protrude outward from the second central portion 306.

A bearing block 312 is coupled to the protruding portions 310 of the bracket 302. The bearing block 312 includes openings 314 that each receive one of the protruding portions 310. The openings 314 allow the bearing block 312 to be slide onto the protruding portions 310.

After the bearing block 312 is slide onto the protruding portions 310, fasteners 316 are coupled to threaded ends of the protruding portions 310. The fasteners 316 are a plurality of nuts that are fastened onto the threaded ends of the protruding portions 310 to hold the bearing block 312 on the bracket 302. This couples the bearing block 312 to the wheel 40.

In some embodiments, the protruding portions 310 may not be threaded but may instead be configured to receive snap fit fasteners. When the protruding portions 310 are configured to receive snap fit fasteners, the fasteners 316 are snap fit fasteners to be coupled to ends of the protruding portions 310 to hold the bracket 302 in place on the wheel 40. These snap fit fasteners 316 are pressed onto the ends of the protruding portions 310 and form a snap fit to retain the bearing block 312.

In some embodiments, the openings 314 of the bearing block 312 may be snap fit openings that receive the protruding portions 310 with snap fit ends to couple the bearing block 312 to protruding portions 310 of the bracket 302.

In some embodiments, the openings 314 in the first edge portion 304 may be interference openings that form an interference fit with the protruding portions 310 to couple the bearing block 312 to the protruding portions 310 of the bracket 302 on the wheel 40.

The bearing block 312 includes an opening 318 that is configured to receive a fastening portion 320 of the wheel cover 100 that protrudes outward from the internal surface 118 of the wheel cover 100. The fastening portion 320 may be cylindrically shaped to be received by and inserted into the opening 318 of the bearing block 312.

The fastening portion 320 includes an opening 322 that extends into the fastening portion in a direction transverse to a direction to which the fastening portion 320 protrudes outward from the internal surface 118 of the wheel cover 100. When the fastening portion 320 is inserted into the opening 318 of the bearing block 312, the opening 322 is aligned with an opening 324 of the bearing block 312. The opening 324 is transverse to the opening 318 of the bearing block 312.

After the fastening portion 320 is inserted into the opening 318 and the opening 324 of the bearing block 312 is aligned with the opening 322 in the fastening portion 320, a fastening component 326 is inserted into the opening 324 of the bearing block 312 and the opening 322 of the fastening portion 320 to couple the fastening portion 320 to the bearing block 312, which couples the wheel cover 100 to the bearing block 312. The fastening component 326 may be a set screw to be threadedly coupled to the openings 322, 324, which may be threaded as well to receive the fastening component 326 when the fastening component 326 is a set screw.

In some embodiments, the openings 322, 324 may be configured to receive an interference fit fastener such that when the fastener 326 is pushed into the openings 322, 324, the fastener 326 and the openings 322, 324 form an interference fit to couple the fastening portion 320 of the wheel cover 100 to the bearing block 312.

In some embodiments, the openings 322, 324 may be configured to receive a snap fit fastener such that the fastener 326 is a snap fit fastener that is inserted into the openings 322, 324 such that a snap fit is formed between the fastening portion 320 and the bearing block 312.

The bearing block 312 includes a rotating portion that rotates with the forward and backward rotation of the wheel 40 when the vehicle 20 is under power and is being driven. The bearing block 312 includes a non-rotating portion that is surrounded by the rotating portion that does not rotate with the forward and backward rotation of the wheel 40 when the vehicle 20 is under power and is being driven. The bearing block may what is commonly referred to as a wheel spinner. The rotating portion and the non-rotating portion may be separating by a plurality of bearing balls such that the rotating portion rotates with the forward and backward rotation of the wheel 40 and the non-rotating portion does not rotate with the forward and backward rotation of the wheel 40. The non-rotating portion remains stationary with respect to the forward and backward rotation of the wheel 40.

The non-rotating portion of the bearing block 312 works together with the retainer assembly 208. The retainer assembly 208 in combination with the bearing block 312 holds the wheel cover 100 in a single position such that the wheel cover 100 does not rotate with the forward and backward rotation of the wheel 40 when the vehicle is being driven. However, the bearing block 312 and the retainer assembly 208 provide degrees of freedom such that the wheel cover 100 may rotate with the wheel 40 when the vehicle is turning in either the rightward and leftward direction as discussed above with respect to FIGS. 3A-3C and 4A-4C.

Figure 6A:
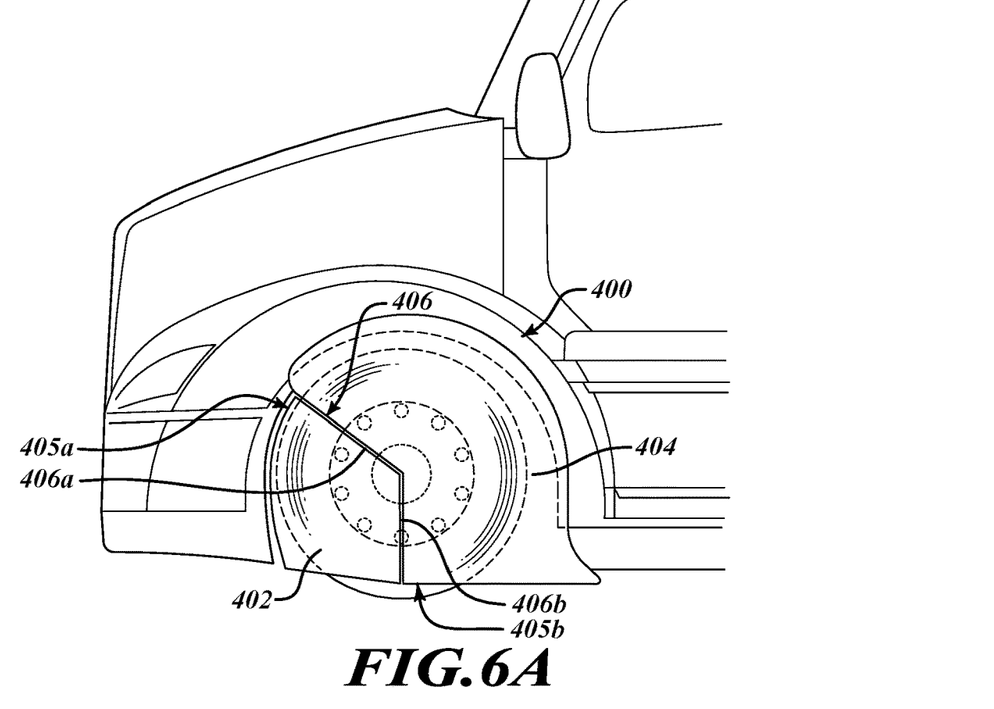
FIG. 6A is a side view of an alternative embodiment of a wheel cover on the vehicle covering the wheel.

FIG. 6A is directed to an alternative embodiment of a wheel cover 400. The wheel cover 400 has a first portion 402 and a second portion 404 that are separated and spaced apart from each other by a slit 406. The slit 406 extends through two outer edges of the wheel cover 400. The slit 406 includes a first portion that extends from an outer edge of the wheel cover 400 to a central region of the wheel cover 400 and then turns and continues extending through the wheel cover 400 to reach another outer edge of the wheel cover 400.

A mounting assembly similar to the mounting assembly 300 shown in FIG. 5 is utilized. However, unlike the mounting assembly 300 in FIG. 5, the mounting assembly includes a bearing block that has two openings. The first portion 402 of the wheel cover 400 has a first fastening portion and the second portion 404 of the wheel cover 400 has a second fastening portion. The first fastening portion is received by one of the openings of the bearing block and the second fastening portion is received by the other of the openings of the bearing block. The first fastening portion and the second fastening portion of the wheel cover 400 are coupled to the bearing block in a similar fashion as discussed above with respect to the coupling of the fastening portion 320 of the wheel cover 100 to the bearing block 312 in FIG. 5.

A retainer assembly is coupled to an internal surface of the second portion 404 of the wheel cover 400. The retainer assembly is the same as the retainer assembly 208 as shown in FIG. 3B.

The wheel cover 400 functions in a similar manner as the wheel cover 100 as discussed with respect to FIGS. 3A-3C and 4A-4C, and, therefore, the discussion of the wheel cover's 400 functionality will not be discussed in detail for brevity and simplicity sake of the present disclosure herein.

Figure 6B:
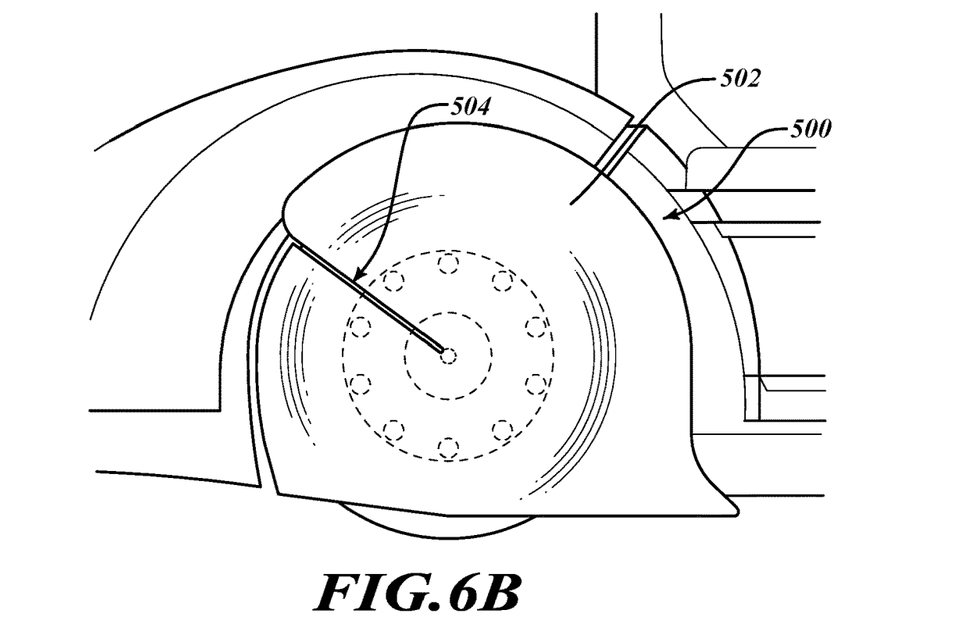
FIG. 6B is a side view of an alternative embodiment of a wheel cover on the vehicle covering the wheel.

FIG. 6B is directed to an alternative embodiment of a wheel cover 500. The wheel cover 500 is made of a single, unitary, continuous portion 502 that is flexible in a similar manner as the material forming the wheel cover 100 as discussed with respect to FIGS. 2A-2D. The wheel cover 500 includes a slit 504 that extends from an outer edge of the wheel cover 500 to a center of the wheel cover 500.

The wheel cover 500 functions in a similar manner as the wheel cover 100, as discussed with respect to FIGS. 3A-3C and 4A-4C and, therefore, the discussion of the wheel covers 500 functionality will not be discussed in detail for brevity and simplicity sake of the present disclosure herein.

Figure 7A:
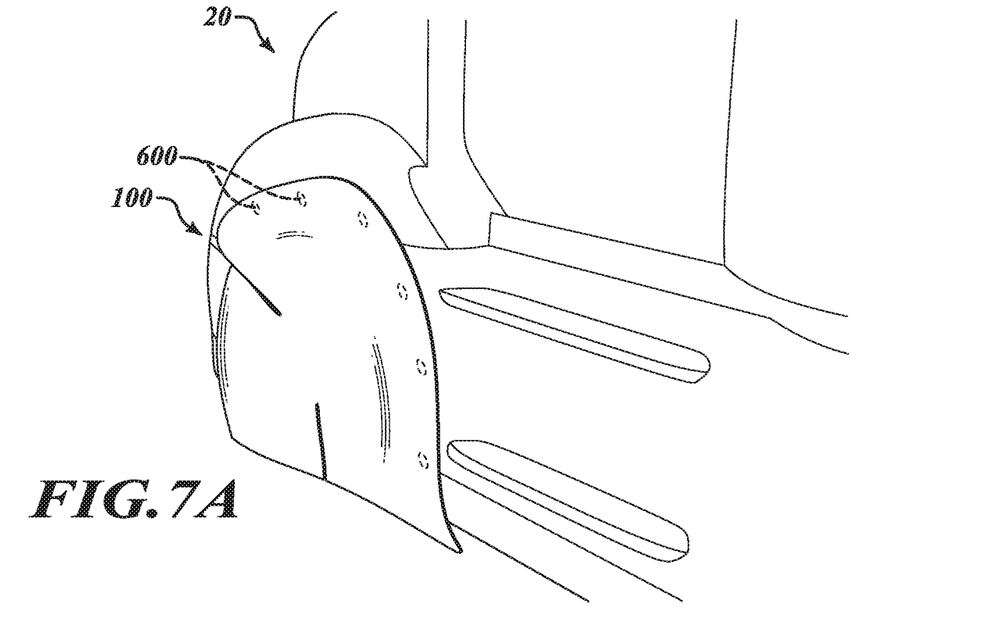
FIG. 7A is a rearward perspective view of an alternative embodiment of a wheel cover system utilizing the wheel cover in FIGS. 2A-2D when the vehicle is turning leftward.
Figure 7B:
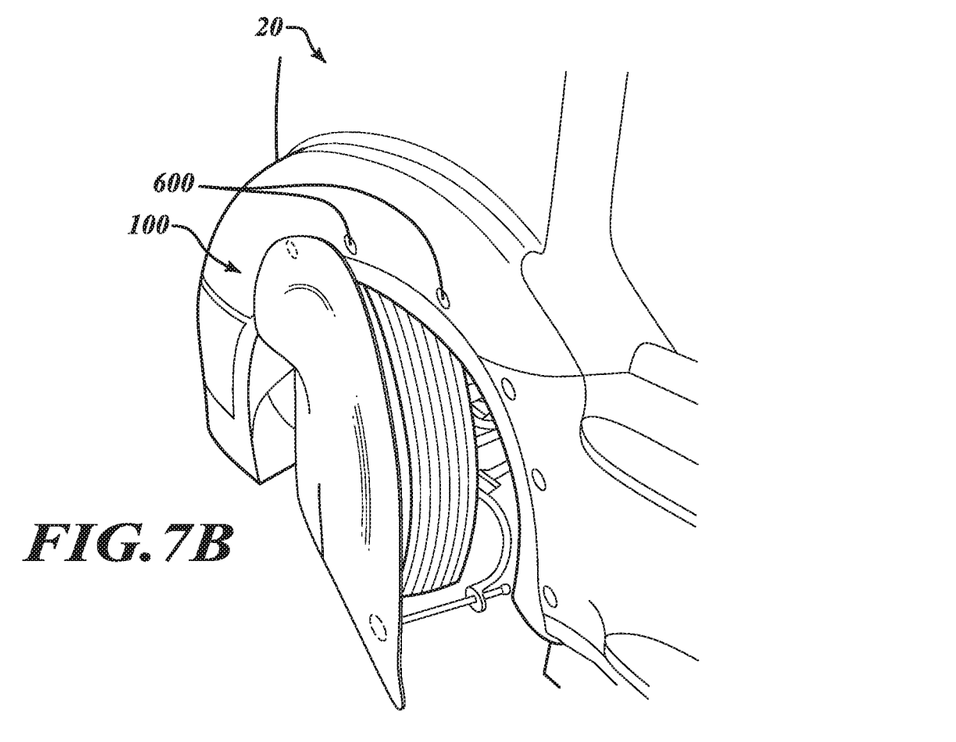
FIG. 7B is a rearward perspective view of the alternative embodiment of the wheel cover system utilizing the wheel cover in FIGS. 2A-2D when the vehicle is turning rightward.

FIGS. 7A and 7B show the wheel cover 100 with bumper components 600 on the fender 44. The bumper components 600 protect the fender 44 and the wheel cover 100 from being scratched and deteriorating when the wheel cover 100 comes into contact with the fender 44.

In some embodiments, the wheel cover 100 may include the bumper components 600 instead of the fender 44. When the bumper components 600 are on the wheel cover 100, the bumper components 600 are on the internal surface 118 of the wheel cover 100.

In some embodiments, the wheel cover 100 may include the bumper components 600 and the fender 44 may also include bumper components 600. The bumper components 600 on the wheel cover 100 are on the internal surface 118 of the wheel cover 100. The bumper components 600 on the fender 44 may be aligned with the bumper components 600 on the internal surface 118 of the wheel cover 100 such that the bumper components 600 on the internal surface 118 of the wheel cover 100 contact the bumper components 600 on the fender 44 when the wheel cover 100 contacts the fender 44.

The bumper components 600 may be coupled to the fender 44 and the internal surface 118 of the wheel cover in a removable manner. Accordingly, if the bumper components are coupled in the removable manner, the bumper components 600 may be removed when the bumper components 600 have deteriorated to a state in which the bumper components 600 should be replaced.

As discussed above, the wheel covers 100, 400, 500 cover all or a portion of the wheel 40, partially cover the wheel well 42, and partially cover the gap or space between the wheel 40 and the fender 44. By providing the wheel cover 100, 400, 500 to the vehicle 20 in the manner discussed in the present disclosure herein, the wheel cover 100, 400, 500 reduces drag of the vehicle 20 at the fender 44 and the wheel well 42 of the vehicle. This reduction in drag by the wheel cover 100, 400, 500 is a result of reducing pressure crosstalk between fast moving outer-body air-flow over external surfaces of the vehicle 20 and slow under-body air flow underneath the vehicle 20 when the vehicle 20 is being driven. When the wheel covers 100, 400, 500 are utilized on the vehicle 20 the amount of air flow passing through the wheel well 42 into the internal space of the vehicle 20 is reduced. In other words, when the vehicle 20 is being driven and when the wheel 40 and wheel well 42 are uncovered, there is a relatively large amount drag that exists relative to when the wheel 40 and the wheel well 42 are covered by one of the wheel covers 100, 400, 500 as shown in FIGS. 2A-2D, 6A-6B, and 7A-7B. This reduction in drag increases the fuel efficiency of the vehicle 20 by reducing an amount of power output by an engine of the vehicle 20, which reduces the cost of running the vehicle 20 and increase the usable lifespan of the vehicle 20 as well.

The gap or space between the tire 48 of the wheel 40 and the fender 44 is a discontinuity along the vehicle 20 that allows significant amounts of pressure cross-talk between the fast moving outer body air-flow and the slow underbody air-flow. The impact of this drag at the gap or space between the tire 48 and the fender 44 increases as wind yaw angle increases. Ideally a smooth sealed surface covering the space between the tire 48 and the fender 44 is desirably to form a minimal drag situation at this discontinuity along the vehicle 20. However, it is difficult to provide a smooth sealed surface at the gap or space between the tire 48 and the fender 44 as the wheel 40 has to turn in the leftward and rightward directions to steer the vehicle 20. The embodiments of the wheel cover 100, 400, 500 with the retainer assembly 208 combined with the bearing block 312 provide a relatively smooth sealed surface at the gap or space between the tire 48 and the fender 44 and still allow the wheel 40 to articulate in the leftward and rightward direction to steer the vehicle 20.

The embodiments of the wheel covers 100, 400, 500 significantly reduce drag of the vehicle 20 by covering a portion of the gap or space between the tire 48 and the fender 44. Accordingly, the embodiments of the wheel covers 100, 400, 500 positively impact the aerodynamic performance of the vehicle and contribute to increased fuel efficiency of the vehicle 20.

The various embodiments described above can be combined to provide further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A wheel cover configured to be coupled to a vehicle, the wheel cover comprising:
    a leading portion; and
    a trailing portion, wherein the trailing portion is configured to bend such that:
        when the vehicle turns in a first direction, a first region of an internal surface of the trailing portion of the wheel cover contacts a first portion of a fender of the vehicle and a second region of the internal surface of the trailing portion of the wheel cover that is located aft of the first region does not contact a second portion of the fender that is located aft of the first portion of the fender; and
        when the vehicle turns in a second direction opposite to the first direction, the second region of the internal surface of the trailing portion of the wheel cover contacts the second portion of the fender and the first region of the internal surface of the trailing portion of the wheel cover does not contact the first portion of the fender.

2. The wheel cover of claim 1, further comprising:
    a first slit that extends from an outer periphery of the wheel cover towards a central region of the wheel cover, wherein the first slit terminates between the outer periphery and the central region of the wheel cover; and
    a second slit that extends from the outer periphery of the wheel cover towards a center of the wheel cover, wherein the second slit extends in a different direction than the first slit, and wherein the second slit terminates between the outer periphery and the central region of the wheel cover.

3. The wheel cover of claim 2, further comprising a central portion located between terminal ends of the first and second slits.

4. The wheel cover of claim 3, wherein the leading portion, the trailing portion, and the central portion of the wheel cover are integral with each other, and wherein the central portion is located between the leading portion and the trailing portion.

5. The wheel cover of claim 1, further comprising:
a first slit that extends from an outer periphery of the wheel cover toward a central region of the wheel cover; and
a second slit that extends from the outer periphery of the wheel cover toward the central region of the wheel cover,
wherein the first and second slits separate the leading portion of the wheel cover from the trailing portion of the wheel cover.

6. A wheel cover for a vehicle, comprising:
a leading portion;
a trailing portion including:
  a first region configured to, in operation, contact a first portion of a fender of the vehicle when the vehicle turns in a first direction; and
  a second region configured to, in operation, contact a second portion of the fender of the vehicle when the vehicle turns in a second direction;
a first slit that extends from an outer periphery of the wheel cover towards a central region of the wheel cover, wherein the first slit terminates between the outer periphery and the central region; and
a second slit that extends from the outer periphery of the wheel cover towards the central region of the wheel cover, wherein the second slit extends in a different direction than the first slit, and wherein the second slit terminates between the outer periphery and the central region.

7. The wheel cover of claim 6, further comprising a central portion located between terminal ends of the first and second slits.

8. The wheel cover of claim 7, wherein the leading portion, the trailing portion, and the central portion of the wheel cover are integral with each other, and wherein the central portion is located between the leading portion and the trailing portion.

9. A wheel cover for a vehicle, comprising:
a leading portion;
a trailing portion including:
  a first region configured to, in operation, contact a first portion of a fender of the vehicle when the vehicle turns in a first direction; and
  a second region configured to, in operation, contact a second portion of the fender of the vehicle when the vehicle turns in a second direction;
a first slit that extends from an outer periphery of the wheel cover toward a central region of the wheel cover; and
a second slit that extends from the outer periphery of the wheel cover toward the central region of the wheel cover,
wherein the first and second slits separate the leading portion of the wheel cover from the trailing portion of the wheel cover.

* * * * *